Oct. 30, 1951     E. W. BRINKMAN     2,572,909
INDEXING MECHANISM FOR MACHINE TOOLS
Filed March 30, 1948     4 Sheets-Sheet 1
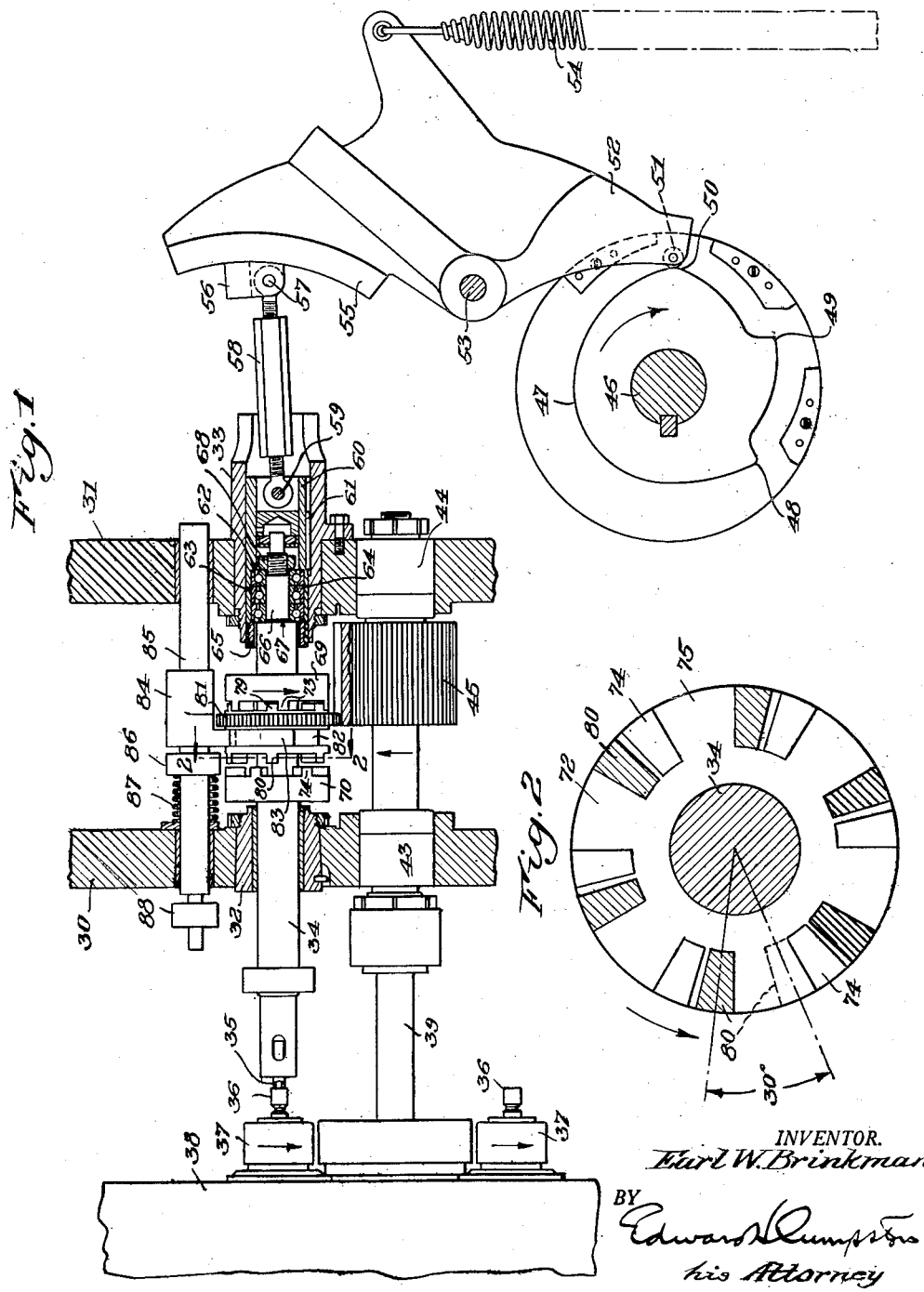
INVENTOR.
Earl W. Brinkman
BY
Edward ...
his Attorney

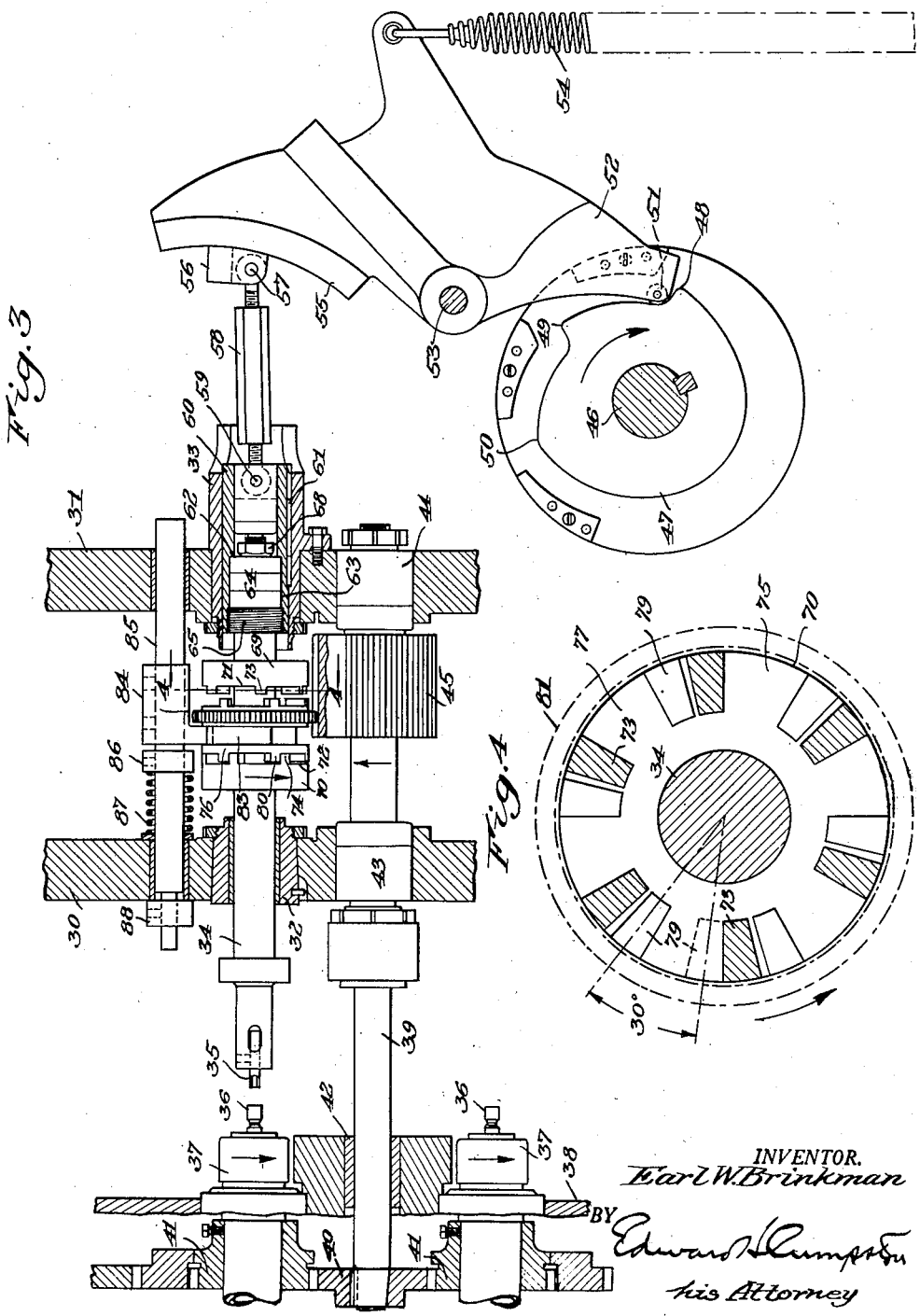

Oct. 30, 1951  E. W. BRINKMAN  2,572,909
INDEXING MECHANISM FOR MACHINE TOOLS
Filed March 30, 1948  4 Sheets-Sheet 3
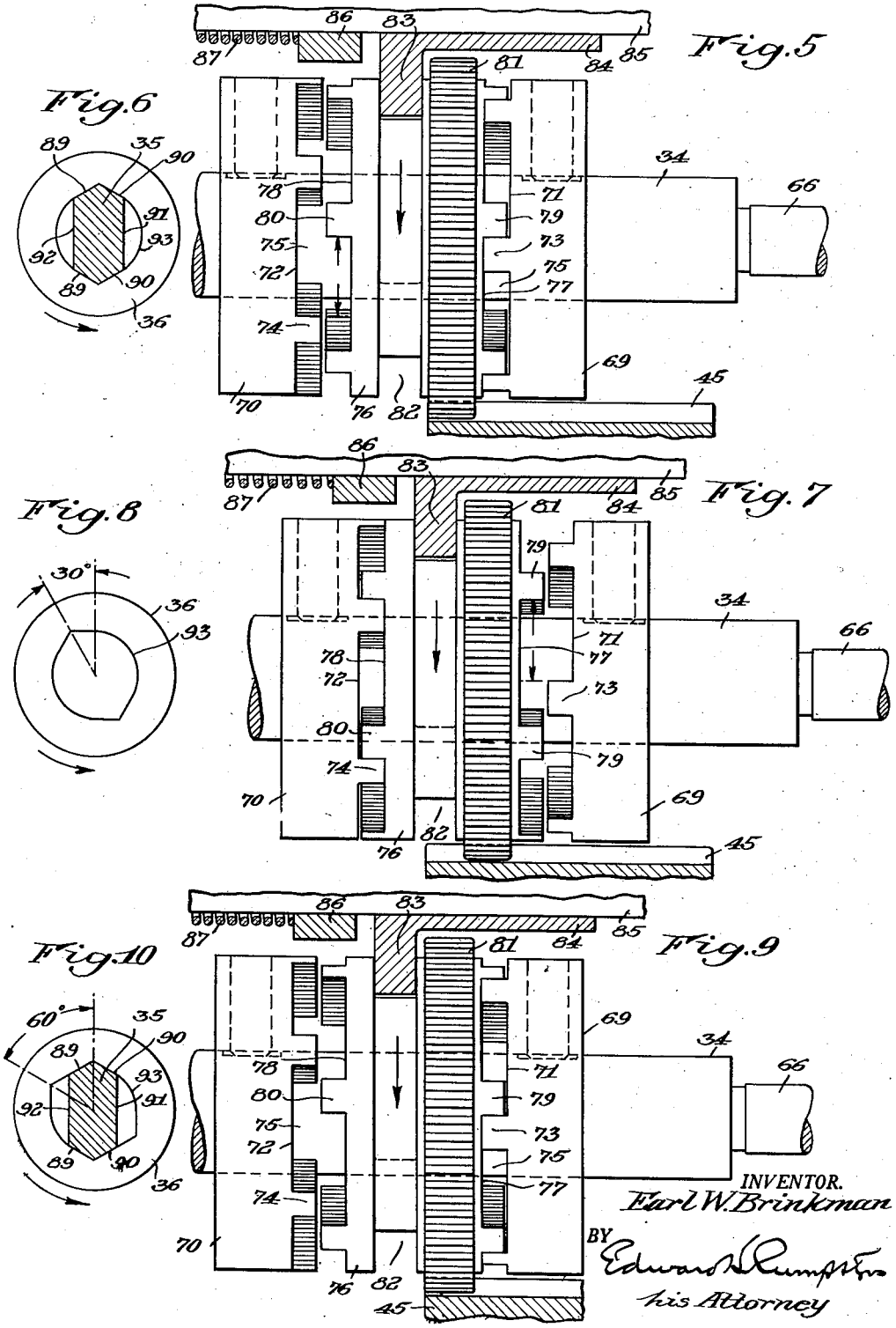
INVENTOR.
Earl W. Brinkman
BY Edward H. Rumpf
his Attorney

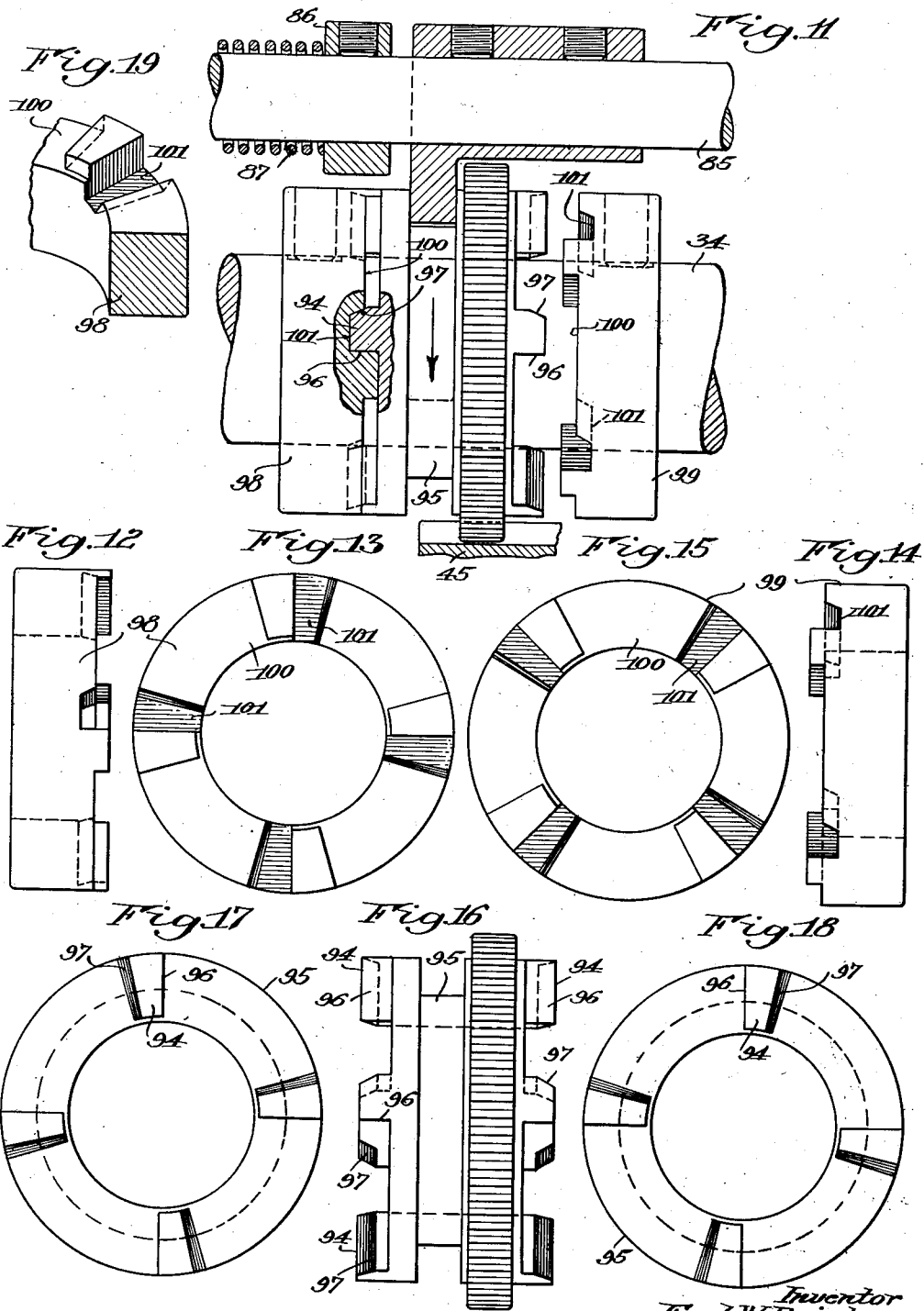

Patented Oct. 30, 1951

2,572,909

UNITED STATES PATENT OFFICE 2,572,909

INDEXING MECHANISM FOR MACHINE TOOLS

Earl W. Brinkman, Gates, N. Y., assignor to Davenport Machine Tool Co., Inc., Rochester, N. Y., a corporation of New York Application March 30, 1948, Serial No. 17,870

10 Claims. (Cl. 74—22)

This invention relates to indexing mechanism for machine tools including multiple and single spindle screw machines and the like, one object of the invention being to provide an improved indexing mechanism of this variety having a more simple and efficient type of construction and a more positive and rapid mode of operation.

Another object is to provide such a mechanism adapted for indexing a spindle accurately through a predetermined angle while maintained in a state of continuous rotation by its driving means.

Another object is the provision of a mechanism of the above character for indexing a continuously rotating spindle in which the spindle is continuously maintained in interlocking engagement with and under control by the mechanism for insuring positive indexing of the spindle through a precisely predetermined angle.

A further object is to provide an indexing mechanism having the above advantages in a type of construction which is operated automatically by relative reciprocating movement of the tool and work toward and from each other to perform successive cutting operations.

Still a further object is the provision of such a mechanism in a compact and self-contained form of construction readily applicable to the existing types of machines at relatively low cost.

To these and other ends the invention resides in certain improvements and combinations of parts, all as will be hereinafter more fully described, the novel features being pointed out in the claims at the end of the specification.

In the drawings:

Fig. 1 is a central, vertical, sectional view through an indexing mechanism embodying the present invention, and showing the same applied to one of the tool spindles of a multi-spindle screw machine, with the tool spindle advanced to cutting position;

Fig. 2 is an enlarged, sectional elevation on the line 2—2 in Fig. 1 and showing one pair of opposing index faces in one position thereof;

Fig. 3 is a view similar to Fig. 1, but showing the parts in an intermediate indexing position during the retraction of the tool spindle;

Fig. 4 is an enlarged, sectional elevation on the line 4—4 in Fig. 3 and showing another pair of opposing index clutch faces in one position thereof;

Fig. 5 is a fragmentary, enlarged side elevation, partly in section, of the clutch parts arranged as shown in Fig. 1;

Fig. 6 is an enlarged end elevation of a workpiece with the tool shown in section in cutting engagement therewith as positioned by the indexing mechanism in the relation of its parts shown in Fig. 5;

Fig. 7 is a view similar to Fig. 5, but showing the parts of the mechanism in a succeeding position thereof during the retraction of the tool;

Fig. 8 is a view similar to Fig. 6, but showing the workpiece rotated through an angle and partially indexed during the retraction of the spindle and the operation of the mechanism to the position shown in Fig. 7;

Fig. 9 is a view similar to Figs. 5 and 7, but showing the parts of the mechanism in the succeeding position occupied at the completion of an indexing movement, ready for the next cutting stroke as shown in Fig. 5;

Fig. 10 is a view similar to Figs. 6 and 8, but showing the work fully indexed with the tool advanced in a second cutting stroke by the operation of the mechanism to the position shown in Fig. 9;

Fig. 11 is a view similar to Fig. 7 but showing clutch engaging faces of somewhat modified form and for indexing through a different angle;

Fig. 12 is a side elevation of the left hand clutch member of Fig. 11, detached;

Fig. 13 is a face view thereof as seen from the right in Fig. 12;

Fig. 14 is a side elevation of the right hand clutch member shown in Fig. 11, detached;

Fig. 15 is a face view thereof as seen from the left in Fig. 14;

Fig. 16 is a side elevation of the intermediate clutch part or gear as shown in Fig. 11, detached;

Figs. 17 and 18 are face views thereof as seen from the left and right, respectively, in Fig. 16, and Fig. 19 is a perspective view of one of the modified clutch shoulders.

The present invention, while particularly useful in application to multiple and single spindle automatic screw machines, is advantageous for use generally in machines in which the workpiece and cutting tool are simultaneously rotated at the same or different speeds and have an intermittent relative reciprocating movement for indexing one relative to the other.

While the invention is disclosed, in the present instance, by way of illustration, as adapted to the broaching, or punching, of a polygonal, or otherwise non-circular socket in the head of a set screw, it is equally applicable to the performance of other types of work, such as in effecting indexing movements between a milling spindle and a drill bit being cut thereby while running at differential speeds, or between a rotary slotting attachment for milling the opposite sides of a square workpiece, or the like.

Referring more particularly to the drawings, there are shown at 30 and 31 (Fig. 1), two spaced wall portions of the supporting frame of a multiple spindle automatic screw machine, formed with alined bearings, 32 and 33, for a rotary driven element or tool spindle 34, which may be one of a circular series of such spindles, as well understood in the art. Mounted in the forward end of the spindle is a broaching tool 35 for cutting engagement with a workpiece, or blank, 36, at the end of a bar of stock projecting through the collet of a work spindle 37 mounted for rotation in bearings in a work head 38. Spindle 37 is one of a circular series of such spindles arranged concentrically about a central drive shaft 39, which is connected by gears, as 40 and 41, with the spindles for rotating each spindle continuously about its own axis. Shaft 39 is supported in a bearing 42 in the work head 38 and also by bearings 43 and 44, in the frame walls, 30 and 31, between which it has fixed thereon an elongated spur gear 45 for driving the tool spindle through means hereafter described.

Means are provided for giving to the rotary tool spindle 34 a longitudinal reciprocating movement toward and from the work, comprising a cam shaft 46 supported for rotation in bearings (not shown) in the machine frame and rotated by gearing connections (not shown) with the mechanism for driving the shaft 39. Shaft 46 has fixed thereon a cam 47 having its profile formed with three lobes or high points, 48, 49, 50. Bearing on the cam is a roller 51 on a lever 52 mounted to oscillate on a shaft 53 on the frame of the machine, the roller being maintained in contact with the cam by a tension spring 54 attached to the arm of the lever, as shown. The lever has an arcuate guideway 55 formed with a T-slot (not shown), in which is adjustably mounted a pivot block 56. Pivoted to the block at one end 57 is a link 58 having a turnbuckle construction for adjusting its length, as shown. The other end of the link is pivotally connected at 59 with one end of a sleeve 60 sliding longitudinally on the bearing 33. Sleeve 60 is splined to the bearing, as at 61, to prevent it from rotating and is formed adjacent its inner end with a shoulder 62 and a portion 63 of reduced internal diameter. A series of ball bearing races 64 are received in the reduced portion 62 and secured between its shoulder 62 and a lock ring 65 screwed into the end of the sleeve. The rear end of tool spindle 34 has a reduced portion 66 which is carried in the bearing races 64 in which the shaft is secured against longitudinal movement by its shoulder 67 and a nut 68 threaded on the spindle. It is apparent from this construction that as cam 47 rocks lever 52 and its block 56, link 58 reciprocates sleeve 60 and, through the ball bearings, 64, reciprocates longitudinally the rotary tool spindle 34 to carry the tool toward and from the work.

The index mechanism proper comprises, preferably, a pair of clutch members or disks, 69 and 70 (Fig. 5), fixed on spindle 34 in spaced relation with each other and formed with opposing clutch faces, 71 and 72, each formed with a plurality of shoulders or teeth, 73 and 74, respectively. The shoulders of each clutch face are spaced apart around the spindle axis by intervals, as 75, of greater width circumferentially than the circumferential thickness of the shoulders, each shoulder having flat side faces lying in radially extending planes, as shown in Figs. 2, 4 and 5. Cooperating with the clutch members 69 and 70 is an intermediate clutch part 76 mounted to slide longitudinally on the spindle 34 and having at its opposite ends an inner pair of clutch members 77 and 78, each formed with a clutch face having shoulders or teeth, as 79 and 80, constructed and arranged as described in connection with the cooperating shoulders 73 and 74 of the outer pair of clutch members 69 and 70. The shoulders 79 and 80 of the inner pair of clutch members 77 and 78 are preferably arranged directly opposite each other in pairs, as shown, while the shoulders 73 and 74 of the outer pair of members are arranged in staggered relation, respectively, for a purpose hereafter described. The intermediate clutch part 76 has fixed thereon a spur gear 81 meshing with the elongated driving gear 45, so that part 76 is continuously rotated at uniform speed in the direction shown by the arrows.

The staggered arrangement of the clutch shoulders is such that when the intermediate clutch part is moved to the right as shown in Figs. 1 and 5, its shoulders 79 interlock with the shoulders 73 of clutch member 69 and are rotated into engagement therewith so as to rotate the spindle 34. When intermediate clutch part 76 is reciprocated toward the left, however, its opposite shoulders 80 enter the intervals 75 between and interlock with the shoulders 74 of clutch member 70 before shoulders 73 are released from the shoulders 79 of the other pair of opposing faces. When intermediate part 76 is shifted far enough to release shoulders 73 from shoulders 79 of the right hand pair of opposing faces, shoulders 80 are first positioned in the trailing ends of the intervals 75 between shoulders 74 of the left hand pair of opposing faces, with the result that the drive of spindle 34 is interrupted by the lost motion thus introduced and the spindle is slowed down by friction until shoulders 80 catch up with and engage the shoulders 74, at which time the spindle 34 has been retarded relative to the intermediate driving part 76 by an angle of 30° (Fig. 8).

At this time, however, intermediate part 76 is reciprocated back by means hereafter described, from the position shown in Fig. 7, into reengagement with clutch part 69, as shown in Fig. 9. During such reengagement, the shoulders 79 are moved to enter and interlock in the trailing ends of the intervals 75 of member 69, after which shoulders 80 are disengaged from shoulders 74 so as to again interrupt the drive of spindle 34, while shoulders 79 are each catching up with and engaging the shoulder 73 of member 69 next succeeding the one engaged at the outset of the operation. During this release from driving engagement, spindle 34 falls back by another 30°, making a total relative indexing movement of 60° (Fig. 10) between the intermediate driving part 76 and the driven spindle 34, corresponding to the angular spacing between the corners of a hexagonal socket.

Since in these shifting movements of the intermediate driving part 76, its shoulders are continuously interengaged with the shoulders of one or the other of the clutch members 69 and 70 fixed on the driven spindle and can be reengaged, step by step, with the next succeeding shoulders of the clutch members 69 and 70, it is evident that the intermediate or driving clutch part 76 is in continuously interlocked engagement with the clutch members 69 and 70 fixed on the driven tool spindle 34, so as to maintain continuous control thereof and to effect positive indexing at each operation through a predetermined angle corresponding to the angular spacing of the clutch face shoulders about the axis of spindle 34.

The means for such shifting of the intermediate clutch part 76 comprises, preferably, a circumferential channel or groove 82 in this part and an engaging shipper arm or yoke 83 carried by a hub 84 fixed on an auxiliary shaft 85 slidable longitudinally at its ends in bearings in the frame wall 30 and 31, this shaft being arranged in parallel spaced relation with spindle 34, as shown. Fixed on shaft 85 is a collar 86 and a compression spring 87 is coiled about the shaft between the collar and wall 30, so as to urge the shaft toward the right, or rearwardly in Fig. 1. One end of the shaft extends forwardly through wall 30 and carries a stop collar 88, for engagement with the wall 30 to limit the rearward movement of the shaft.

It is evident from this construction that as tool spindle 34 is reciprocated forwardly, clutch member 69 is maintained in driving engagement with the intermediate clutch part 76 during the forward or cutting stroke of the tool. On retraction of spindle 34 by its cam, spring 87 shifts shaft 85 and shipper 83 rearwardly so as to maintain intermediate clutch part 76 in engagement with clutch member 69 until collar 88 strikes wall 30 and stops the rearward movement of the intermediate clutch part. Continued retraction of the spindle then effects a relative shifting of the clutch parts to engage member 70 with the intermediate part 76, as shown in Fig. 7, with partial indexing of the spindle through 30°. On return of the spindle 34 forwardly, the clutch parts are shifted back to reengage the intermediate part with clutch member 69, during which movement a further indexing of 30° is effected and the parts are indexed through the total angle of 60° required for the particular broaching method and tool here disclosed, as will now be more fully described.

The preferred method and tool for this broaching or punching operation are more fully disclosed in my copending patent application, Serial No. 17,869, filed March 30, 1948. Punching Method and Tool, comprising a tool bar, as 35, having its diametrically opposite sides each formed with a pair of faces 89 and 90 (Fig. 6) intersecting each other at an angle of 120° corresponding with the angle at the corner between adjacent faces in the hexagonal socket to be formed. The cutting edges are formed by the intersections of these faces 89 and 90 with the free or cutting ends of the bar; such end being slightly recessed to provide a rake for the cutting edges. The bar is reduced in thickness at its intermediate sides 91 and 92 to clear the opening 93 in the workpiece 36, this opening being first roughed out with a drill having a diameter approximately equal to the distance between opposite faces of the hexagonal socket to be formed. Each of the faces 89 and 90 is as wide or slightly wider than one-half the width of a face of the hexagon and the first broaching stroke of the tool is thus adapted to form two opposite angles or corners of the hexagonal socket and at least one-half of each of the adjacent faces as shown in Fig. 6. The tool is then retracted, indexed through 60° as described, and again advanced so as to cut another opposite pair of corners in the socket, as shown in Fig. 10. Another repetition of this operation serves to complete the hexagonal socket which is thus formed in three operations, by an efficient broaching method which greatly reduces the force required as compared with complete broaching of the socket in a single stroke of the tool.

It is apparent from the above description that the invention provides a simple, practical and efficient indexing mechanism which is positive and rapid in operation. The indexing operation is accomplished during continuous rotation of the work and tool and in an automatic manner, the parts being actuated by the relative reciprocating movement between the work and tool spindles. The part to be indexed is continuously maintained in interlocking engagement with the indexing mechanism throughout the operation, so as to insure at each operation a positive indexing through a predetermined angle. Since the cutting position of the tool is controlled solely by engagement between the shoulders 73 and 79 of clutch members 69 and 77, only this one pair of clutch faces requires accurate finishing and the construction as a whole requires relatively few parts, such parts being adapted for manufacture, assembly and installation at a comparatively low cost. While the invention has been disclosed by way of illustration, as adapted to the broaching of hexagonal sockets in screw heads, it is readily applicable to a wide variety of tools and of types of work to be performed, as well as to use with a wide variety of machine tools, as hereinabove stated.

In the embodiment of the invention described above, the driving clutch shoulders engage only at their leading faces with the trailing faces of the driven clutch shoulders and such engagement is ordinarily sufficient. For some purposes, however, it may be desirable to provide a still more positive control of the driven spindle during cutting operation of the tool, and Figs. 11 to 19, inclusive, show a somewhat modified embodiment for this purpose. In this modified form, the clutch shoulders 94 of the intermediate clutch part or gear 95 have their leading faces 96 lying, as before, in radial planes through the axis of the spindle 34, but the outer end of the trailing face of each of these driving shoulders is preferably tapered outwardly and inwardly as at 97, such inclination making a relatively small angle with the normal to the clutch face of, say, 15°.

The driven clutch members 98 and 99 have the intervals 100 between their shoulders of less depth than the height of the shoulders, being shown in the present instance as of about one-half depth. The end of each interval adjacent the trailing edge of each shoulder is formed with a recess 101 of the full depth of the shoulder. The leading side of this recess, which is the trailing face of the shoulder, lies, as before, in a plane containing the axis of the spindle, but the trailing side or wall of the recess is flared outwardly and backwardly to correspond with the tapered face 97 of the opposing shoulder, thus forming, at the leading end of each interval, a wedge-shaped recess or socket for the reception of the wedge-shaped end of an opposing shoulder, as 94. The angle of taper may obviously vary from 15°, but should be sufficient to facilitate the ready seating of each shoulder in driving engagement in its recess, without being so large as to have an outward camming action on the shoulder.

In this modification also, each clutch face is provided with but four shoulders corresponding to an indexing angle of 90° as useful, for example, in broaching rectangular sockets in screw heads or indexing a rotary slotting attachment for milling a square work piece. The other parts of the mechanism in this modification are otherwise the same as in the modification described above, the shifting of the spindle and clutch parts being coordinated with the progressive engagement of the opposing cam faces, if necessary, by applying a suitable contour to the cam 47. It is evident that as the spindle is shifted longitudinally, the shoulders of the intermediate clutch part enter and move along the intervals of the opposing parts, eventually dropping into the tapered recesses in driving engagement with the opposing shoulders. Such wedging interengagement of the shoulders locks the opposing clutch faces together and positively controls the driven clutch face against chattering or other movement forwardly or backwardly relative to the driving face while engaged therewith. The operation of this modification is otherwise as explained in connection with the modification first described above.

It will thus be seen that the invention accomplishes its objects and while it has been herein disclosed by reference to the details of preferred embodiments, it is to be understood that such disclosure is intended in an illustrative, rather than a limiting sense, as it is contemplated that various other modifications in the construction and arrangement of the parts will readily occur to those skilled in the art, within the spirit of the invention and the scope of the appended claims.

I claim:

1. An indexing mechanism comprising a plurality of clutch members mounted for rotation about a common axis with an outer pair of said members spaced apart on opposite sides of an inner pair thereof, the opposing faces of the members of said pairs each having a plurality of clutch shoulders spaced apart around said axis by intervals of greater width circumferentially than said shoulders and arranged in staggered relation with the cooperating shoulders on the opposing face to effect a predetermined lost motion in the engagement of shoulders of opposing faces when said faces are moved into shoulder engaging proximity with each other, driving and driven elements one of which is connected with said outer pair of members and the other with said inner pair thereof, and means for effecting relative axial shifting movement between said pairs of members in opposite directions to engage the shoulders of opposing faces successively, for indexing said elements through a predetermined angle.

2. An indexing mechanism as specified in claim 1 in which said opposing faces and shoulders are positioned and arranged to maintain one of the shoulders of one of said members of said outer pair continuously interlocked in position for engagement with one of the shoulders of one of said members of said inner pair during said relative axial shifting movement to effect a positive indexing movement between said elements through a predetermined angle.

3. An indexing mechanism as specified in claim 2 in which said driving element is connected with said inner pair of clutch members and said driven element is connected with said outer pair of clutch members and means are provided for effecting axial shifting movement of said inner pair of members in opposite directions successively to effect engagement between said opposing faces successively, for positively indexing said elements through a predetermined angle.

4. An indexing mechanism comprising a continuously rotating driving element, a rotatable driven element, clutch members for connecting said elements for rotation normally at the same speeds, said clutch members being mounted on one of said elements with an outer pair of said members spaced apart on opposite sides of an inner pair thereof, the opposing faces of the members of said pairs each having a plurality of clutch shoulders spaced apart around the axis of said element by intervals of greater width circumferentially than said shoulders and arranged in staggered relation with the cooperating shoulders of the opposing face to effect a predetermined lost motion by movement of the shoulders of one face in the intervals of the opposing face, means for connecting said driving element with one of said pairs of members, means for connecting the other of said pairs of members with said driven element, means for shifting one of said elements longitudinally and mechanism actuated by the shifting of said element for alternately engaging and disengaging the shoulders of each pair of opposing faces of said members, to index said driven element positively through a predetermined angle.

5. An indexing mechanism as specified in claim 4 in which the shoulders of one of the opposing faces of each pair thereof have wedge-shaped outer ends and the intervals between the shoulders of the other of said faces are formed adjacent their shoulders with wedge-shaped recesses for receiving said wedge-shaped shoulder ends and interlocking the opposing faces of each pair against relative movement in either direction.

6. An indexing mechanism as specified in claim 5 in which the mechanism actuated by the shifting of said elements comprises a spring means for yieldably moving said intermediate member in one direction on said spindle, and stop means for limiting the movement of said intermediate member in said direction, said opposing members being movable into clutching engagement alternately with said intermediate member by said reciprocating movement of said spindle, to effect positive indexing of said spindle through a predetermined angle.

7. An indexing mechanism comprising a spindle to be rotated, a plurality of clutch members mounted on said spindle with an outer pair of said members spaced apart on opposite sides of an inner pair thereof, the opposing faces of said pairs each having a plurality of clutch shoulders spaced apart around said axis by intervals of greater width circumferentially than said shoulders and arranged in staggered relation with the cooperating shoulders of the opposing face to effect a predetermined lost motion by movement of the shoulders of one face in the intervals of the opposing face, said opposing faces and shoulders being arranged to maintain one of the shoulders of one of said members of said outer pair continuously interlocked in position for engagement with one of the shoulders of one of said members of said inner pair, means for driving one of said pairs of members continuously at uniform speed, means for connecting the other of said pairs of members to said spindle, means for reciprocating said spindle longitudinally, and mechanism actuated by the shifting of said spindle for alternately engaging and disengaging the shoulders of each pair of opposing faces of said members, to effect positive indexing of said spindle through a predetermined angle.

8. An indexing mechanism comprising a rotary driving element, means for driving said element continuously at substantially uniform speed, a continuously rotating driven spindle, a pair of spaced opposing clutch members fixed on said spindle, an intermediate clutch member engaging said driving element and slidable longitudinally on said spindle for engagement alternately with said spaced members, said members having their opposite faces each provided with clutch shoulders spaced apart around said spindle by intervals of greater width circumferentially than said shoulders and arranged in staggered relation to effect a predetermined lost motion in the engagement of shoulders of opposing faces when said faces are moved into shoulder engaging proximity with each other, means for reciprocating said spindle longitudinally, and mechanism actuated by the reciprocating movement of said spindle for moving said intermediate clutch member to alternately engage said spaced members and effect positive indexing of said spindle through a predetermined angle.

9. An indexing mechanism as specified in claim 8 in which the mechanism actuated by the reciprocating movement of said spindle comprises a bearing means in which an auxiliary shaft is supported for longitudinal reciprocating movement at one side of and parallel with said spindle and shipper means on said shaft engaging said intermediate member for controlling the movement thereof conjointly with said reciprocating spindle.

10. An indexing mechanism comprising a rotary driving element, means for rotating said element at substantially uniform speed, a continuously rotating driven spindle, means for reciprocating said spindle longitudinally, a pair of spaced opposing clutch members fixed on said spindle, an intermediate clutch member engaging said driving element and slidable on said spindle, said members having opposing faces provided with spaced interengaging shoulders arranged in staggered relation with the cooperating shoulders of the opposing face to effect a step-by-step advancement of said element relative to said spindle by engagement of said intermediate member alternately with said spaced members, an auxiliary shaft provided with means for engaging and sliding said intermediate member, spring means for moving said shaft in one direction, and stop means for limiting the movement of said shaft in said direction, to effect positive indexing of said spindle through a predetermined angle during reciprocation of said spindle in opposite directions.

EARL W. BRINKMAN.

REFERENCES CITED

The following references are of record in the file of this patent:

UNITED STATES PATENTS

| Number | Name | Date |
|---|---|---|
| 1,173,573 | Hayden | Feb. 29, 1916 |
| 1,482,110 | Bolesky | Jan. 29, 1924 |
| 1,874,022 | Anderson | Aug. 30, 1932 |